(12) United States Patent
Von Der Lippe et al.

(10) Patent No.: US 11,469,883 B2
(45) Date of Patent: *Oct. 11, 2022

(54) SYSTEM AND METHOD TO GENERATE ENCRYPTION KEYS BASED ON INFORMATION OF PERIPHERAL DEVICES

(71) Applicant: WINCOR NIXDORF INTERNATIONAL GMBH, Paderborn (DE)

(72) Inventors: Carsten Von Der Lippe, Paderborn (DE); Steffen Priesterjahn, Paderborn (DE); Julian Fetting, Paderborn (DE); Ulrich Mennewisch, Paderborn (DE)

(73) Assignee: Wincor Nixdorf International GmbH, Paderborn (DE)

( * ) Notice: Subject to any disclaimer, the term of this patent is extended or adjusted under 35 U.S.C. 154(b) by 118 days.

This patent is subject to a terminal disclaimer.

(21) Appl. No.: 17/018,007

(22) Filed: Sep. 11, 2020

(65) Prior Publication Data

US 2021/0075601 A1 Mar. 11, 2021

Related U.S. Application Data

(63) Continuation of application No. 15/928,400, filed on Mar. 22, 2018, now Pat. No. 10,778,418.

(30) Foreign Application Priority Data

Mar. 22, 2017 (EP) .................................... 17162404

(51) Int. Cl.
*H04L 9/08* (2006.01)
*G06F 21/60* (2013.01)
*G06F 21/62* (2013.01)

(52) U.S. Cl.
CPC .......... *H04L 9/0822* (2013.01); *G06F 21/602* (2013.01); *G06F 21/62* (2013.01);
(Continued)

(58) Field of Classification Search
CPC ....... H04L 9/08; H04L 9/0822; H04L 9/0861; H04L 9/0866; H04L 9/0897; G06F 21/60; G06F 21/602; G06F 21/62
See application file for complete search history.

(56) References Cited

U.S. PATENT DOCUMENTS 8,681,707 B2 3/2014 Kesselman
9,100,173 B2 8/2015 Ryu
(Continued)

FOREIGN PATENT DOCUMENTS

EP 26452878 A2 10/2013

OTHER PUBLICATIONS

Office action from European Patent Office for corresponding application EP17162404.2-1218, dated Dec. 23, 2020.
(Continued)

*Primary Examiner* — Shaqueal D Wade-Wright
(74) *Attorney, Agent, or Firm* — Black, McCuskey, Souers & Arbaugh LPA (57) ABSTRACT

A digital computing device controlling the access to encrypted digital information includes a control unit, peripheral devices connected to the control unit, a hard disk connected to the control unit storing the digital data, and a data encryption key configured for encrypting the digital data. The control unit is configured to detect the peripheral devices, read identification information from the peripheral devices that denotes the respective peripheral device, generate for the peripheral devices a respective key encryption key on the basis of the read identification information, initially store at least one encrypted data encryption key that is generated by encrypting the data encryption key using the respective key encryption key, in a memory area of the hard disk, and after the initial storage determine the data encryption key by decrypting the encrypted data encryption key
(Continued)

using the respective key encryption key derived from the respective identification information.

20 Claims, 4 Drawing Sheets

(52) U.S. Cl.
CPC .......... *H04L 9/0861* (2013.01); *H04L 9/0866* (2013.01); *H04L 9/0897* (2013.01)

(56) References Cited

U.S. PATENT DOCUMENTS

| | | | | |
|---|---|---|---|---|
| 9,215,250 | B2* | 12/2015 | Porten | G06F 21/85 |
| 9,231,921 | B2* | 1/2016 | Raskin | G06F 21/602 |
| 9,235,952 | B2 | 1/2016 | Nguyen | |
| 2002/0144024 | A1* | 10/2002 | Kumpf | G06F 13/102 |
| | | | | 710/12 |
| 2004/0254014 | A1 | 12/2004 | Quaraishi | |
| 2008/0198801 | A1 | 8/2008 | Kesselman | |
| 2008/0247540 | A1 | 10/2008 | Ahn | |
| 2012/0130952 | A1 | 5/2012 | Kwon | |
| 2014/0053272 | A1 | 2/2014 | Lukacs | |
| 2014/0245444 | A1 | 8/2014 | Lutas | |
| 2014/0307869 | A1* | 10/2014 | Krummel | H04L 9/0822 |
| | | | | 380/28 |
| 2015/0199682 | A1 | 7/2015 | Kalgi | |
| 2016/0125695 | A1 | 5/2016 | Nguyen | |
| 2017/0124329 | A1 | 5/2017 | Ghafoor | |
| 2017/0160374 | A1 | 6/2017 | Wirola | |
| 2017/0187523 | A1 | 6/2017 | Andrews | |
| 2017/0243023 | A1 | 8/2017 | Lee | |
| 2018/0268144 | A1 | 9/2018 | Warpinski | |
| 2019/0281449 | A1* | 9/2019 | Luo | H04L 9/30 |

OTHER PUBLICATIONS

Office action from European Patent Office for corresponding application EP17162404.2-1218, dated Apr. 2, 2020.
Extended European Search Report for corresponding application EP17162404 dated Sep. 7, 2017.

* cited by examiner

SYSTEM AND METHOD TO GENERATE ENCRYPTION KEYS BASED ON INFORMATION OF PERIPHERAL DEVICES

CROSS-REFERENCE TO RELATED APPLICATION

This application is a Continuation of U.S. patent application Ser. No. 15/928,400, filed Mar. 22, 2018, now U.S. Pat. No. 10,778,418, issued Sep. 15, 2020, which claims priority to European Patent Application Serial No. 17 162 404.2, which was filed Mar. 22, 2017, and is incorporated herein by reference in its entirety.

BACKGROUND AND SUMMARY

The application US2014307869 A1 discloses an approach how generate keys for encrypting data on disks of an ATM. The complete disclosure of US2014307869 A1 is incorporated by reference. This application refers to the examples and abbreviations of the keys in US2014307869 A1. According to US2014307869 A1, the apparatus comprises a control unit, which can be part of an ATM (automated teller machine), at least one peripheral device connected to the control unit and a hard disk connected to the control unit. Very often, the peripheral devices are connected by a serial connection, like USB (Universal Serial Bus) RS232 etc. The hard disk is connect via ATA, SATA, SAS, USB, M.2 etc. The control unit is set up to detect the peripheral device connected to the control unit, to generate a data encryption key DEK, to read an identification information from the peripheral device, W_1. The identification information explicitly denotes the peripheral device, to generate a key encryption key, KEK_1, on the basis of the read identification information, to store an encrypted data encryption key VDEK_1, which can be generated by encrypting the data encryption key DEK using the key encryption key KEK_1, in a memory area of the hard disk, to ascertain the data encryption key by decrypting the encrypted data encryption key using the key encryption key, and to encrypt digital data to be stored on the hard disk in encrypted form using the data encryption key or to decrypt digital data stored on the hard disk in encrypted form using the data encryption key.

The effect achieved thereby is, inter alia, that the digital data stored on the hard disk in encrypted form cannot be read without a data encryption key. If the hard disk is unallowed removed from the apparatus and stolen, the thief does not have access to the data encryption key that is necessary for decryption. The thief is able to obtain said data encryption key only if he is able to decrypt the encrypted data encryption key, which is possible only using the key encryption key, however, the encrypted data encryption key has been encrypted using the key encryption key. According to the invention, the key encryption key has been calculated using a computable algorithm and an identification information read from the peripheral device, such as a serial number, a serial number information code, an MAC address, a network address, a hardware address, an Ethernet address, an airport address, a WiFi address and/or a manufacturer identification datum. Therefore, the thief is able to ascertain the key encryption key only if he knows the identification information read from the peripheral device. However, there is no possibility of this if he has merely been able to steal the hard disk and has had to leave the peripheral device behind.

Accordingly, the concept is based on the insight that hard disk encryption with a key encryption key that is determined from an explicit identification information read from a locally connected peripheral device cannot, in principle, be decrypted by a thief of the hard disk unless he has the identification information read from the locally connected peripheral devices.

Digital data may be any type of data that can be stored on the hard disk, operating system, particularly program data, log data, user data. Within the meaning of the invention, hard disks are considered to include magnetic disk memories and other nonvolatile memories, particularly also solid state hard disks, SD cards and other nonvolatile semiconductor memories, one which the operating system and/or the application data are stored.

A further approach of the concept is that if the key encryption key has become publicly accessible without the associated encrypted data encryption key and hence also the data encryption key having become publicly accessible, the hard disk does not need to be recoded but rather it is merely necessary for a new key encryption key to be generated, for example using another algorithm for generating the key encryption key, and for the old encrypted data encryption key to be replaced on the hard disk by this new encrypted data encryption key. This has the advantage that laborious recoding of the hard disk can be avoided.

The apparatus is particularly an automated teller machine, a cash system or an automatic cash safe. The cash system is particularly a cash system as used in retail that is used by a cashier or is embodied as what is known as a "self-checkout system".

In another approach the apparatus has at least two peripheral devices, wherein the control unit is set up to detect each peripheral device connected to the control unit, to read from each peripheral device a respective identification information that explicitly denotes the respective peripheral device, to generate for the peripheral devices a respective on the basis of the respective read identification information, to store encrypted data encryption keys, which can be generated by encrypting the data encryption key with the respective key encryption key, on the hard disk, to ascertain the data encryption key from the encrypted data encryption keys using the respective key encryption key by means of decryption, and to permit access to encrypted digital data stored on the hard disk only when the data encryption key can be ascertained from at least one of the encrypted data encryption keys.

In one embodiment, there is particularly a configuration with N peripheral devices, N being a natural number greater than or equal to 2. For each of the N peripheral devices, a respective key encryption key is calculated for each identification information read from the respective peripheral device. The data encryption key is encrypted with each of the key encryption keys, as a result of which N encrypted data encryption keys are generated. According to the invention, in the M-of-N scenario, at least M devices are needed to derive the key encryption key (KEK). The scheme is mathematically done so, that each combination of M device information lead to the same KEK. This allows what is known as a "three out of five" scenario to be implemented, for example. In this case, the number of peripheral devices taken into account is equal to 5=N and the number of encrypted data encryption keys from which the data encryption key can actually be ascertained is equal to 3=M. Hence, the access to encrypted digital data stored on the hard disk is permitted only when the data encryption key can be ascertained from at least three of the encrypted data encryption keys. Alternatively, however, any other "M out of N"

scenarios are possible, M and N being positive integers where M<N or M=N. This concept is also x of y mode where x=M and y=N.

The peripheral device or the peripheral devices may be an encrypting PIN pad, a receiving and/or disbursing module for bills or other paper-based media, a coin disbursing and/or coin receiving module, a card reader for reading magnetic stripe and/or chip cards, a screen, a touch screen, a video camera, a printer, an alphanumeric keypad, a device for paying in cheques, an interface module for providing an interface, an RFID read and/or write module, a barcode scanner, a headphone port, a loudspeaker, a network card, a graphics card, a memory element, a semiconductor memory element, a further hard disk and/or a banknote recognition and/or banknote authenticity checking unit. The encrypting PIN pad is a special keypad for the secure input of PINs on automated teller machines or money transfer terminals.

In a further configuration, the hard disk has at least one unencrypted memory area and at least one memory area encrypted using the data encryption key. This allows the encrypted data encryption keys to be stored in the unencrypted memory area and the digital data that are to be stored in encrypted form to be stored in the encrypted memory area.

This has the advantage that the encrypted data encryption keys are easily accessible and can be decrypted only by an authorized user who has the key encryption key(s). In addition, the advantage is that the digital data to be stored in encrypted form are stored on the hard disk separately from digital data that do not need to be stored in encrypted form, which allows simplified hard disk management.

In a further configuration, the digital data to be stored in encrypted form are stored as files encrypted using the data encryption key. This has the advantage, inter alia, that the digital data to be stored can be moved without restriction on the hard disk. This allows variable management of the hard disk without being tied to a size specification for particular areas on the hard disk.

Practical experiences with the USB mode in the configuration have shown that the original design does not fit too many specialties in certain environments, especially in the self-service system or ATM environment. That can be very problematic, as the system does not boot if there is trouble with the key generation.

The following cases for USB devices in an ATM can be considered:
  bcdDevice descriptor field may contain firmware version information,
  a USB device may report a different USB device descriptor if the boot loader is active and no firmware is loaded (like in the case that the device was switched off while loading new firmware),
  a USB device may change its VID/PID due to current configuration or report different VID/PID under windows with appropriate drivers,
  some devices of the applicant change the highest bit of the PID depending whether they are in download mode, especially when downloading new firmware, it is also possible that other bits are used, which should normally not be used.
The Bit indicates that the device is in special condition, for example firmware uploadable condition, failure condition etc. . . .
  some descriptor fields may include special characters,
  WN devices (and some devices developed on behalf of WN) have a serial number in descriptor 0x80, but in that case iSerialNumber may be missing or an empty string,
  some WN ATMs contain more than one instance of the same device type (like the customer connection box or USB camera).

To solve the above-mentioned situations the key generation has to be improved.

One aspect of the invention is a digital computing device controlling the access to encrypted digital information. This digital computing device can be an ATM, any other self-service system or computer that stores critical data.

This device comprises a control unit, which can be a CPU, central processing unit on a motherboard, or any other device having a processing device and connectors for one or more peripheral devices, which are connected to the control unit. The peripheral devices can be, an encrypting PIN pad, a receiving and/or disbursing module for bills or other paper based media, a coin disbursing and/or coin receiving module, a card reader for reading magnetic strip and/or chip cards, a screen, a touch screen, a video camera, a printer, an alphanumeric keypad, a device for paying in checks, an interface module for providing an interface, an RFID read and/or write module, a barcode scanner, a headphone port, a loudspeaker, a network card, a graphics card, a memory element, a semiconductor memory element, a further hard disk or a banknote recognition and/or banknote authenticity checking unit.

The control unit is connected to a hard disk storing the digital data, which is to be encrypted and decrypted. All devices are considered as a hard disk that store information permanently, like rotating disks, flash disks, etc. Preferably, a Disk encryption is used which is a technology that protects information by converting it into unreadable code that cannot be deciphered easily by unauthorized people. Disk encryption uses disk encryption software or hardware to encrypt bits of data that go on a disk or disk volume. Disk encryption prevents unauthorized access to data storage. The application does not differentiate between full disk encryption (FDE) or whole disk encryption often signify that everything on disk is encrypted—including the programs that can encrypt bootable operating system partitions—when part of the disk is necessarily not encrypted. On systems that use a master boot record (MBR) or the analogous parts defined by the UEFI standard, that part of the disk remains none encrypted. According to the configuration, the whole disk can be encrypted or only the partition on which the operating system of the digital computing device is located.

To access the data on the hard disk a data encryption key (DEK) configured for encrypting the digital data stored on the hard disk is needed and has to be provided in general to the hard disk controller. In a software environment, the hard disk controller does not need to be able to decrypt or encrypt the data. Instead, the decryption and encryption happens via a driver on the operating system kernel level.

The control unit is configured to detect the peripheral devices, read from each of the peripheral devices a respective identification information that denotes the respective peripheral device, and to generate for the peripheral devices a respective key encryption key (KEK) on the basis of the read identification information.

Initially at a first booting, the DEK has to be determined to be encrypted and to be stored on the hard disk. This is done by storing at least one encrypted data encryption key that is generated by encrypting the data encryption key using the respective key encryption key, in a memory area of the hard disk. The same approach can be used when re-configuring the digital computing device, which will be explained below.

After the initial storage, the data encryption key will be decrypted every time the digital device is booting. The decrypted data encryption key is derived from the respective key encryption key, which again is derived from the respective identification information of the peripheral devices.

The control unit is configured to encrypt digital data to be stored on the hard disk in encrypted form using the data encryption key when writing data onto the hard disk or to support to decrypt digital data that are stored on the hard disk in encrypted form using the data encryption key, when reading data from the hard disk.

The control unit is further configured to receive a USB descriptor of a connected USB peripheral device, and to read 0x80 USB descriptor field to determine the identification information of the USB peripheral device. Other addresses that do not generate a conflict with other information needed for the invention can also be used.

The USB standard defines that whenever a new device is discovered at the USB bus, a USB device descriptor will be transferred to the PC. This USB device descriptor contains several texts and fields, like a field for the serial number of the USB device. Very often serial numbers of USB devices stored in the corresponding field iSerial are used to distinguish devices. Unfortunately, the usage of the serial number as it is defined in the USB standard has some severe disadvantages like in the case if a device is plugged from one USB port to another. Therefore, an alternative approach has been developed that defines that a serial number shall be stored in the (usually unused) field with the index 0x80.

This can be additionally to the official iSerial field, but also alternatively to the iSerial field.

For example, if the iSerialNumber Value is available in a USB device descriptor, that value will be used for key generation.

If the iSerialNumber value is missing or empty (the iSerialNumber descriptor is available, but an empty string) and the 0x80 descriptor is available, the 0x80 descriptor will be used for key generation.

In an alternative approach, certain peripheral devices are excluded based on a Vendor ID and/or Product ID received from the peripheral device for the key encryption key generation.

There might USB devices exist that are reporting VID/PID in a stable way, but are problematic and stubborn concerning other fields of the USB device descriptor. Such devices may provide some information only under certain conditions or in an unexpected or un-normed format. These devices shall be covered by a blacklist of devices where only VID/PID fields shall be used. It is possible to provide a black list to the control unit for devices that shall be used for the USB mode concerning VID/PID, but without use of any additional Descriptor Information.

This blacklist will be used internally inside control unit to mask devices that are known for dirty serial number behavior or that have incompatible USB descriptor formats.

In another alternative embodiment, it is possible to determine specifically one or more data fields of each received USB descriptor based to the Vendor ID and the Product ID in the USB descriptor for the key encryption key generation.

In one example, the key encryption key generation algorithm will not use the complete USB device descriptor as delivered by the device when requesting the device descriptor, but only the fields that are specified to be used for key generation (VID, PID and serial number if available). Thus, the field bcdDevice for example might not be used.

In another alternative embodiment, additional unique information is added to determine the key encryption key if the data fields of the USB descriptors used to generate the key encryption key are identical for several peripheral devices, especially if the Vendor ID and/or Product ID are identical and no other unique information can be determined in the USB descriptor.

In the special cases where several devices of the same kind (VID and PID identical) but without usable serial number are connected, most or all of these devices shall be taken into account for key generation. Otherwise, the situation may happen that that the digital computing device has a lot of devices like cameras, but only one of them is really used for the encryption.

For example, in the context of an ATM with one dispenser and three USB cameras without usable serial numbers and without using additional information, the situation will result in y<=2, since all the USB cameras have the same PID but no usable serial numbers. So, the ATM can be run in the 1of1, 1of2 or 2of2 mode. The 2of2 mode is not recommendable because the failure of one device like the dispenser is sufficient to prevent the ATM from booting. The value x==1 should also be avoided because an attacker would only need to take away the PC of the ATM which can be compared with the control unit with one USB device, to boot it remotely.

For a better understanding, the 1of1 mode is a special form of the x-of-y device mode. In this mode, the system is successfully booting once the system recognizes x devices out of the bulk of y, that it was trained to know. An ATM usually consists up to several dozens of USB devices. It would be an easy process if the ATM boots (by decrypting the hard disk) only in the case if the ATM recognizes all devices that should be present. Unfortunately, that is difficult in normal life, because it is usual that sometimes a device is missing like because it is defective or has been exchanged by a technician (thus having a different serial number). Therefore, this product offers that the owner (in this case, the owner is usually a bank) knows how many of the trained USB devices must be present that the hard disk is allowed to be decrypted. The 1of1 mode is a special form where just one USB device has been trained and must be present at boot time.

To avoid this problem, in the current example all USB cameras will be considered by the device training, thus y<=4. A practical approach would be the 2of4 mode, because in this context a certain tolerance of more than one device is provided if there is some device failure.

A possible way would be to add a counter to the device information that the second, third, . . . device has a different value for the key generation. The counter can be based on the number of the USB slot used at the PC housing.

Another alternative approach is the reset of the encrypted data encryption key based on remote controllable access rules and automatically re-generate (re-init) a new data encryption key.

A service technician should have the ability to initiate a re-init of the learned devices for the KEK generation. An example is the case where the technician exchanged an external device with a spare one of the same type but a different serial number.

A possible implementation would be that the control unit checks the existence of a certain information that can be activated remotely. For example, a signed configuration file can be used to process a re-init, this can be automatically created in a local or remote editor and put or copied on the hard disks. In case the control unit finds this file in predefined location and attests its correct signing a re-init is performed.

The re-init can be critical from the security perspective, because if a control unit is trained on several (new) devices/ USB-devices, these can be a handful of thumb drives that can be hijacked together with the control unit. This would allow an attacker to boot the control unit outside of the original location, in such cases the customer (owner of the digital computing device, in case of an ATM usually the bank or specific organisations) is expected to support that no activities are allowed, which will negate the security. Thus, the digital computing device is designed that certain product features can be cryptographically secured activated and deactivated.

For example, a repeated application of the initialization by a technician requires that the technician is allowed to copy a certain file, determining terminal security configuration, into a specific folder. The owner (aka the bank) may define if and when a technician is authorized to do so, or can even copy the file himself into the folder.

Furthermore, an additional security system provides the ability to centrally create "tickets" which are distributed to the local digital computing device. These are small signed command files that are executed if they are found in defined folders at the digital computing device.

As explained before it may be dangerous if the number of recognized USB devices at boot falls below or reaches a certain threshold, because this may end in a situation where the PC does not boot any more.

This situation can be mitigated by performing a re-init. But in such a case the application or monitoring software, that usually initiates the re-init, is notified that a re-init is necessary.

In an alternative embodiment, this re-init can be performed automatically by checking the number of working peripheral devices providing the identification information to generate a respective key encryption key, if the number falls below a predefined threshold; the system starts to re-generate a data encryption key using also newly connected peripheral devices.

In this case, the control unit performs the above described re-init process automatically in case the number of peripheral devices falls under the threshold. After determining that the number of devices is below the threshold, the control unit automatically updates information that is read at next booting by a Pre-Boot Authentication, PBA. The software in the PBA checks, if a sufficient number of USB devices is connected that matches the threshold, at least y devices are present. If this is the case, a new KEK will be computed. In an alternative embodiment in case the threshold has been reached, an information is sent to the owner or their infrastructure so that an automatic re-init can be authorized. Since an automatic re-init can be a security risk, it will preferably need some kind of authorization (at least an opened safe door or a digital signature).

In a possible embodiment, the PBA can be a small Linux partition that is executed previously to the start of windows operating system on which the ATM is running. The PBA determines the KEK and DEK and provides the information to the disk controller, which is responsible for the encryption and decryption. One main task of that PBA is to generate/reconstruct the KEK that it can be used to derive the DEK and thus to decrypt the hard disk to start to start the main operating system, i.e. windows.

This is the foundation of the idea that the software running under windows itself is periodically checking if the number of usable USB devices is falling below a defined threshold and an appropriate event shall be reported. The most relevant data should be collected in the PBA, but has to be evaluated after the next windows start, which requires a data transfer from PBA to windows.

The software running under windows software then computes if the threshold has been reached, by the difference between x and the potential boot devices (sum of the device really used at boot and the devices that have not been used for generating the KEK, but are known and trained).

As the situation may even change during normal windows operation, like if a device fails, this condition should also be checked in normal operation to be able to process corrective measures if the number of usable devices are falling under the threshold.

In an alternative embodiment, the automatic check of the number of working peripheral devices is done by a regular check of USB data sets and storing the USB data sets in protocols list, which are preferably encrypted.

A first protocol list is generated during the execution of the first system on the first partition and a second protocol list is generated during the execution of the operation of the second partition, and the threshold is determined by comparing information of the first and second protocol list.

In a possible embodiment for monitoring purpose, an event will be generated after booting if the difference between necessary USB devices and available USB devices is below a previously configured threshold.

The computation of these values will be done on the basis of two USB data sets.

USB Data Set #1:
generated in the PBA
list of all enumerated USB devices at the time when the
  PBA recognized sufficient devices to continue the boot
  process.
contains the following information for each enumerated
  device:
  PID/VID
  iSerial/0x80 serial number if available
  flag if this device was used as a boot device
The second data set is generated during the operation of windows.
USB Data Set #2:
generated during operation of the ATM
contains all the information of the USB data set #1 above
The information of USB Data Set #2 will be continuously
  updated as a log.
Both logs will be encrypted preferably with a public key, which can be stored on the hard disk.

The PBA log must also be encrypted, because it also contains most information about the USB devices in its kernel log.

In an alternative embodiment, the encryption doesn't have to be done as the data already resides on an encrypted disk.

In an alternative embodiment, parts of the Desktop Management Information, DMI, of the Basic Input Out System, BIOS, or Unified Extensible Firmware Interface, UEFI, or System Management BIOS, SMBIOS, of the control unit are used to calculate the key encryption key.

An option will be integrated that allows the usage of specific DMI information in the data for the key generation. This option is available for the USB mode and the transparent mode.

This option is selectable by a configuration editor. If this option is set, some DMI information from the motherboard will be added to the data used for key generation.

These fields may include:
PC type identification,
MB identification,
MB serial number and/or GUID, which defines a unique ID of a motherboard and is unique for each motherboard of motherboard manufacture.
Other fields are also possible.

The information that is selected shouldn't change after a BIOS update, change of BIOS settings or HW change other than the motherboard. Therefore, any MAC address of an onboard network card is critical, because if it is switched off in the BIOS menu, this information is not available.

Anyway, this document is describing only which data may be integrated into the key generation. One potential way would be to compute a hash out of the DMI data and exclusively or this value with the KEK/DEK. Other encryption algorithms can also be applied like XOR, PGP, DES, AES etc.

In an alternative embodiment WN USB devices (VID=0x0aa7), the most significant bit of the PID will be masked out before the PID value will be used for key generation (KEK).

Some of the USB devices that have been developed by Wincor Nixdorf have at least two operating modes, one for normal operation and one mode for the firmware download. The actual mode of the device is notified by the most significant bit of the PID. An example is the CMD-V5 dispenser that registers as Vid_0aa7&Pid_4101 in the normal mode. In the firmware download mode (DFUX), he registers as Vid_0aa7&Pid_c101. The most simple way on masking that MSB is to either always set or reset that bit, to make sure that the key generation does not depend on the Bit. This example can also be transferred to other Bits that indicate a changeable status of the device.

Further parts of the invention include a method that implemented in hardware and/or software enables a digital computing device to implement the above mentioned.

DETAILED DESCRIPTION OF PREFERRED EMBODIMENTS

Figure 1:
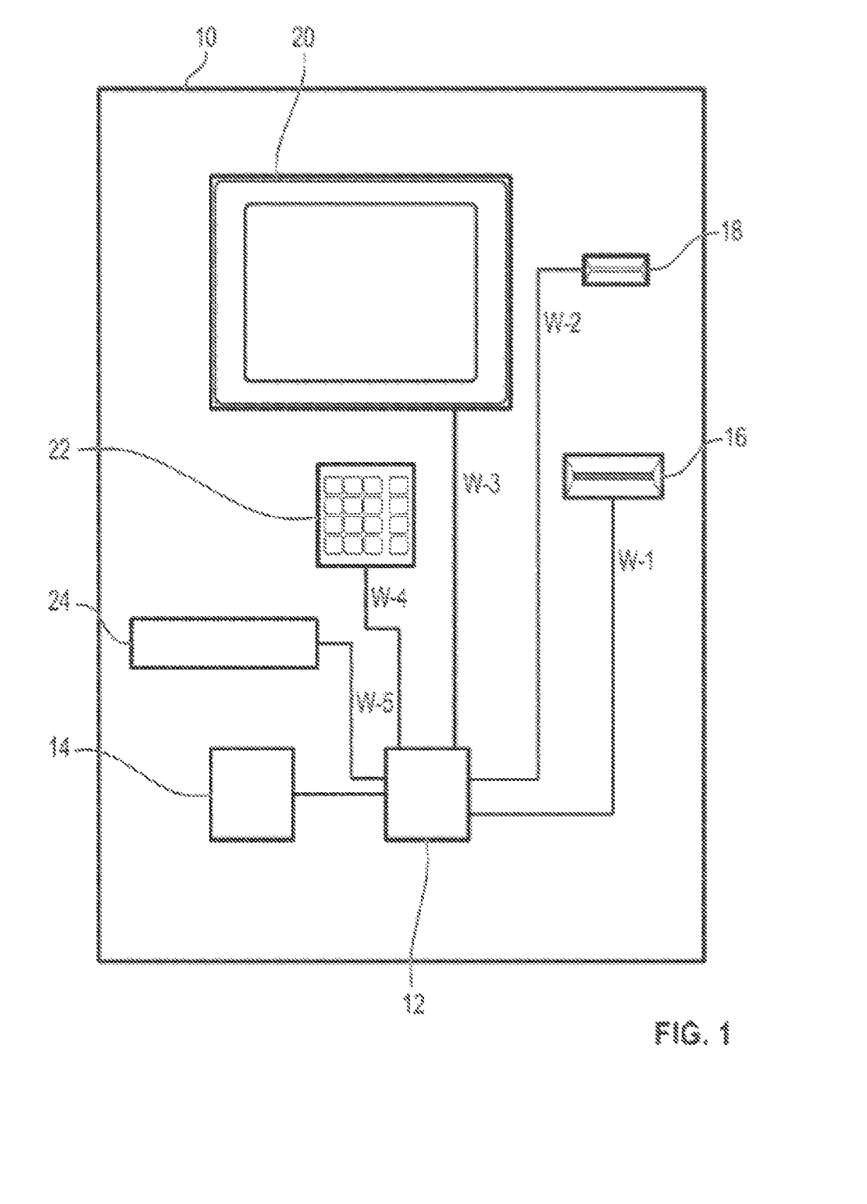
FIG. 1 shows a schematic illustration of a device.

FIG. 1 shows an apparatus 10 according to the claims. The apparatus 10 in this example is particularly an automated teller machine (ATM) that allows bills to be paid in and also paid-in bills to be disbursed again. The apparatus 10 has a control unit 12 to which both a hard disk 14 and a plurality of further peripheral devices are connected.

For the purpose of paying in and/or disbursing bills, the apparatus 10 contains a receiving and disbursing module 16 that is connected to the control unit 12. The receiving and disbursing module 16 has an identification information W_1 that can be read by the control unit 12.

For the purpose of reading magnetic strip and/or chip cards, the apparatus 10 has a card reader 18 that is in turn connected to the control unit 12. The card reader 18 has an identification information W_2 that can be read by the control unit 12.

For the purpose of displaying messages and for the purpose of function selection, the control unit 12 is connected to a touch-sensitive screen 20, what is known as a touch screen. The screen 20 has an identification information W_3 that can likewise be read by the control unit 12.

For the purpose of inputting personal identification numbers (PINs) or secret numbers or other numerical values, an encrypting PIN pad 22 is furthermore installed that is likewise connected to the control unit 12. The encrypting PIN pad 22 has an identification information W_4 that can likewise be read by the control unit 12.

In addition, the apparatus 10 has a printer 24, connected to the control unit 12, for printing account statements or other user-specific data. The printer 24 has an identification information W_5 that can likewise be read by the control unit 12.

Figure 2:
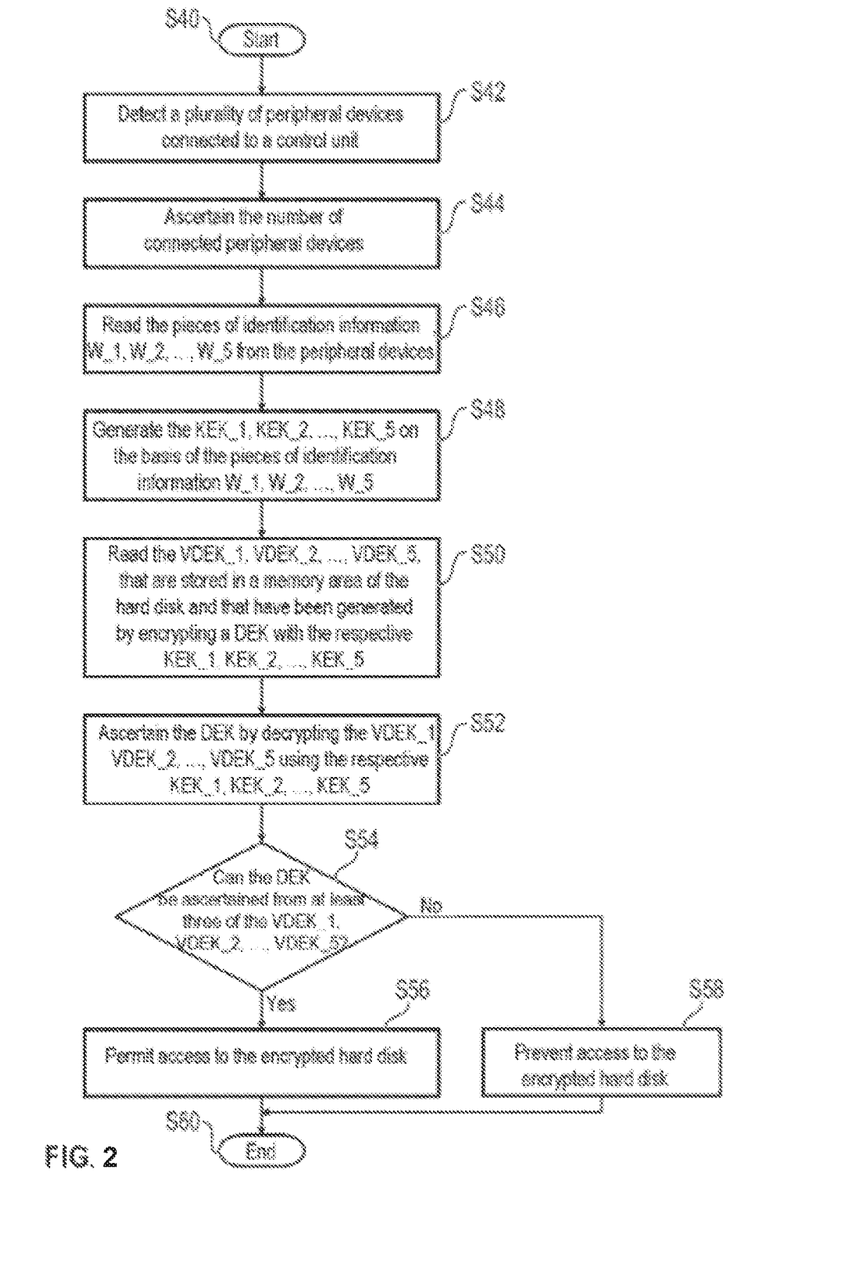
FIG. 2 shows a flowchart for a method for initializing the device with several KEK.

FIG. 2 describes a method for initializing and operating the apparatus 10, particularly methods for automatic secure encryption of the hard disk 14.

Figure 3:
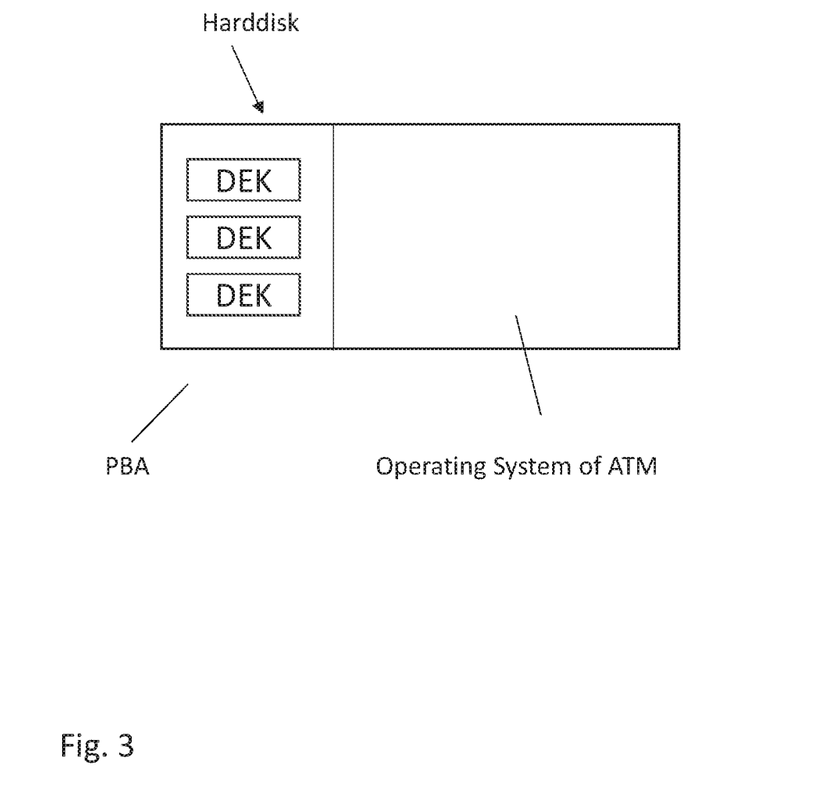
FIG. 3 shows the partitions of the hard disk

FIG. 3 shows a flowchart for a method for operating the apparatus 10. When the method has been started in step S40, step S42 first of all involves all detectable peripheral devices 16, 18, 20, 22, 24 connected to the control unit 10 being detected.

In the next step S44, the number of peripheral devices 16, 18, 20, 22, 24 connected to the control unit 10 for which a respective explicit identification information can be read from a memory of the respective peripheral device 16, 18, 20, 22, 24 is ascertained. In the present case, the number of peripheral devices 16, 18, 20, 22, 24 ascertained in this manner is five. In other embodiments, these components may be any positive integer.

Next, step S46 involves five identification information W_1, W_2, . . . , W_5 being read from the respective peripheral device 16, 18, 20, 22, 24, each identification information explicitly denoting the respective peripheral device 16, 18, 20, 22, 24.

On the basis of the five read identification information W_1, W_2, . . . , W_5, five key encryption keys KEK_1, KEK_2, . . . , KEK_5 are generated in step S48.

As a departure from the method described above, the next step S50 involves the five encrypted data encryption keys VDEK_1, VDEK_2, . . . , VDEK_5, stored in a memory area of the hard disk 14, which have been generated by encrypting a data encryption key DEK, generated in an initialization step for the apparatus 10, using the five key encryption keys KEK_1, KEK_2, . . . , KEK_5 and have been written to the hard disk, being read. In other embodiments, step S50 can be provided at any point between the beginning S40 and step S48.

Next, step S52 involves the data encryption key DEK being ascertained by decrypting the encrypted data encryption keys VDEK_1, VDEK_2, . . . , VDEK_5 using the respective key encryption key KEK_1, KEK_2, . . . , KEK_5.

In the next step S54, a test is performed to determine whether the data encryption key DEK can be ascertained from at least three of the encrypted data encryption keys VDEK_1, VDEK_2, . . . , VDEK_5.

In this case, a single test can be performed as follows: the read identification information W_1 is used to calculate the key encryption key KEK_1 by means of the algorithm that is present in unencrypted form. The encrypted data encryption key VDEK_1 is then decrypted using the key encryption key KEK_1. If the identification information obtained in this manner can be used to decrypt encrypted useful data stored on the hard disk 14, the read identification information W_1 matches the original identification information W_1 used for calculating the key encryption key KEK_1. In this case, the data encryption key DEK can be ascertained from the encrypted data encryption key VDEK_1. If such a match can be ascertained for at least three of the five encrypted data encryption keys VDEK_1, VDEK_2, . . . , VDEK_5, the control unit 12 permits the access to the useful data stored on a hard disk 14 in encrypted form.

If it has been established in step S54 that the data encryption key DEK can be ascertained from at least three of the encrypted data encryption keys VDEK_1, VDEK_2, . . . , VDEK_5, the method continues with step S56 and permits the access to the useful data stored on the hard disk 14 in encrypted form.

If it has not been established in step S54 that the data encryption key DEK can be ascertained from at least three of the encrypted data encryption keys VDEK_1, VDEK_2, . . . , VDEK_5, the method continues with step S58 and does not permit the access to the useful data stored on the hard disk 14 in encrypted form.

FIG. 3 shows the layout of the hard disk. As pointed out above the hard disk is a storage media that stores information permanently. Different technologies can be used to implement a hard disk. In a possible embodiment, the hard disk has two partitions. The first partition is the PBA in which the encrypted DEK/DEKs are stored. Depending on the encryption algorithm and the number of devices that are necessary to start the system (threshold), several keys (DEK) can be stored or only one key can be stored in corresponding file. This petition is booted first to determine the DK and to decrypt the second petition which operating system of the ATM is located. In a possible embodiment, the hard disk supports the hardware driven encryption, wherein the hard disk controller performs the encryption. For this approach, the hard disk controller receives the key to encrypt the information, which is sent to and received from the hard disk. This key is the decrypted DEK, which is encrypted with the KEK and stored on the first non-encrypted partition. In a possible embodiment, also the first partition can be encrypted.

The Linux operating system on the first partition is a very small kernel, which reads from the connected peripheral devices the USB information to determine identification information of the peripheral devices and to calculate the KEK and to decrypt the DEK.

This DEK is then transferred to the controller of the hard disk or depending on the implementation to the kernel driver, which is then responsible for the encryption.

After that the operating system of the ATM this started which can be a Windows or any other operating system which implements the functionality of the ATM.

Figure 4:
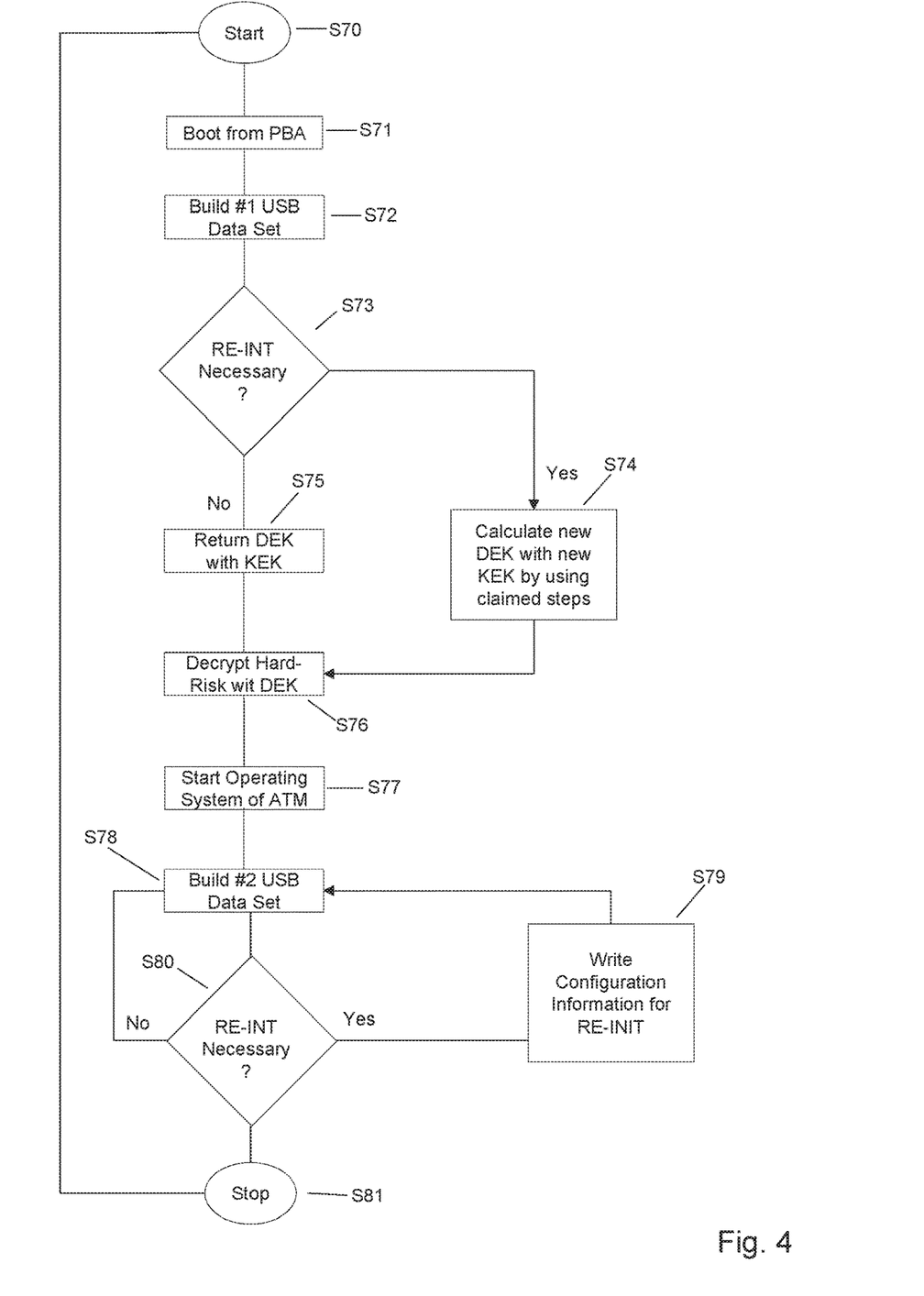
FIG. 4 shows a flowchart of the re-init.

FIG. 4 shows an example of the re-init of the DEK. In step S70, the device is turned on. In step S71 booting from the PBA is performed. Then a first set of USB devices in their data are in descriptors is created. In step S73, it is checked whether the threshold of available devices has been reached and re-init is necessary. In case that enough peripheral devices which can provide the necessary information for the DEK are determined the identification information of the peripheral devices are read and the KEK is generated (Step S75).

The DEK is then used in step S76 to decrypt the second partition and to start the operating system of the ATM (step S77).

In case that the re-in it is necessary in step 73 in new DEK is calculated with new KEK. This approach all peripheral devices are considered according to the selections that have been mentioned in the claims. New fields can be considered of the USB descriptors, certain devices can be excluded, additional information can be used when using a plurality of identical devices etc. (step S74). The calculation of the KEK has been described above.

When running the operating system of the ATM second USB data set is determined in regular intervals checking the connected peripheral devices and their functionality. In case certain devices are not working anymore, the Data Set provides the corresponding information. In case there are not enough devices anymore (below the threshold), which can be used for a future restart of the ATM the configuration information is written to indicate that the re-init has to be performed when rebooting the device. This information can be written into certain folder structures and to which the owner of the ATM allows the access.

The invention claimed is:

1. A digital computing device controlling access to encrypted digital data, comprising:
    a control unit;
    one or more peripheral devices connected to the control unit;
    a hard disk connected to the control unit, storing the digital data; and
    a data encryption key configured for encrypting the digital data stored on the hard disk;
    wherein the control unit is configured to:
        detect the peripheral devices,
        read from each of the peripheral devices a respective identification information that denotes the respective peripheral device,
        generate for the peripheral devices a respective key encryption key on the basis of the read identification information,
        store at least one encrypted data encryption key that is generated by encrypting the data encryption key using the respective key encryption key, in a memory area of the hard disk,
        after storing the at least one encrypted data encryption key, determine the data encryption key by decrypting the encrypted data encryption key using the respective key encryption key derived from the respective identification information,
        encrypt digital data to be stored on the hard disk in encrypted form using the data encryption key, and
        decrypt digital data that are stored on the hard disk in encrypted form using the data encryption key;
    wherein the control unit is further configured to:
        receive a USB descriptor of a connected USB peripheral device, and to read a specific descriptor field to determine parts of an identification information of the USB peripheral device, which has not been used by an USB standard to store identification information and which does not conflict with information need in the USB descriptor,
        exclude peripheral devices based on at least one of a Vendor ID and a Product ID received from the peripheral device for the key encryption key generation,
        reset the encrypted data encryption key based on remote controllable access rules and automatically re-generate a new data encryption key,
        automatically check a number of working peripheral devices providing the identification information to generate a respective key encryption key, wherein if the number falls below a predefined threshold, starting to re-generate data encryption key using also newly connected peripheral devices, and use parts of a Desktop Management Information, DMI, of a Basic Input Out System, BIOS, or Unified Extensible Firmware Interface, UEFI, System Management BIOS, SMBIOS, of the control unit to calculate the key encryption key.

2. The digital computing device according to claim 1, wherein the hard disk comprises a first partition for pre boot authentication in which based on the identification information of peripheral devices the key encryption key is determined, which is used to decrypt a second partition in which an operating system for the digital computing device is stored, wherein a first system on the first partition is booted before an operating system of the second partition is booted.

3. The digital computing device according to claim 1, wherein the control unit is further configured to generate a first protocol list during an execution of the first system on a first partition and a second protocol list is generated during an execution of an operation of a second partition, and the threshold is determined by comparing information of the first and second protocol list.

4. The digital computing device according to claim 1, wherein the control unit is further configured to read the specific descriptor field at address 0x80 of the USB descriptor.

5. The digital computing device according to claim 1, wherein the control unit is further configured to determine specifically one or more data fields of each received USB descriptor based on the Vendor ID and the Product ID in the USB descriptor for the key encryption key generation.

6. The digital computing device according to claim 1, wherein the control unit is further configured to add additional unique information to determine the key encryption key if the data fields of the USB descriptors used to generate the key encryption key are identical for several peripheral devices, especially if the at least one of the Vendor ID and the Product ID are identical and no other unique information can be determined in the USB descriptor.

7. The digital computing device according to claim 6, wherein the additional unique information are one or more of the following:
counters and the number of a USB port the peripheral device is connected to.

8. The digital computing device according to claim 1, wherein the excluded devices are stored in a list, as a blacklist.

9. The digital computing device according to claim 1, wherein the automatic check of the number of working peripheral devices is done by a regular check of USB data sets and storing the USB data sets in protocols list, which are encrypted.

10. The digital computing device according to claim 1, wherein of the DMI or SMBIOS or UEFI one or more of the following information is used:
PC type identification, Motherboard, MB, identification, MB serial number, and GUID of the MB.

11. A method for a computing device for controlling access to encrypted digital data, the computing device including:
a control unit;
one or more of peripheral devices connected to the control unit;
a hard disk connected to the control unit, storing the digital data; comprising a data encryption key configured for encrypting the digital data stored on the hard disk;
the method comprising the following steps and wherein the control unit performs the following steps:
detecting the peripheral devices,
reading from each of the peripheral devices a respective identification information that denotes the respective peripheral device,
generating for the peripheral devices a respective key encryption key on the basis of the read identification information,
storing at least one encrypted data encryption key that is generated by encrypting the data encryption key using the respective key encryption key, in a memory area of the hard disk,
after storing of the at least one encrypted data encryption data key, determining the data encryption key by decrypting the encrypted data encryption keys using the respective key encryption key derived from the respective identification information,
encrypting digital data to be stored on the hard disk in encrypted form using the data encryption key, and
decrypting digital data that are stored on the hard disk in encrypted form using the data encryption key,
wherein the control unit is further performing the following steps:
receiving a USB descriptor of a connected USB peripheral device, and reading a descriptor field to determine parts of an identification information of the USB peripheral device,
excluding peripheral devices based on at least one of a Vendor ID and a Product ID received from the peripheral device for the key encryption key generation,
resetting the encrypted data encryption key based on remote controllable access rules and automatically re-generating a new data encryption key,
automatically checking the number of working peripheral devices providing the identification information to generate a respective key encryption key, wherein if the number falls below a predefined threshold, starting to re-generate data encryption key using also newly connected peripheral devices, and
using parts of a Desktop Management Information, DMI, of a Basic Input Out System, BIOS, or Unified Extensible Firmware Interface, UEFI, or System Management BIOS, SMBIOS, of the control unit to calculate the key encryption key.

12. The method according to claim 11, wherein the hard disk comprises a first partition for pre boot authentication in which based on the identification information of peripheral devices the key encryption key is determined, which is used to decrypt a second partition in which an operating system for the digital computing device is stored, wherein a first system on the first partition is booted before an operating system of the second partition is booted.

13. The method according to claim 11, wherein a first protocol list is generated during an execution of a first system on a first partition and a second protocol list is generated during an execution of an operation of a second partition, and the threshold is determined by comparing information of the first and second protocol list.

14. The method according to claim 11, wherein the control unit further performs the step of reading the specific descriptor field at address 0x80 of the USB descriptor.

15. The method according to claim 11, wherein the control unit further performs the step of determining specifically one or more data fields of each received USB descriptor based to the Vendor ID and the Product ID in the USB descriptor for the key encryption key generation.

16. The method according to claim 11, wherein the control unit further performs the step of adding additional unique information to determine the key encryption key if the data fields of the USB descriptors used to generate the key encryption key are identical for several peripheral devices, especially if the at least one of the Vendor ID and the Product ID are identical and no other unique information can be determined in the USB descriptor.

17. The method according to claim 16, wherein the additional unique information are one or more of the following:
   counters and the number of a USB port the peripheral device is connected to.

18. The method according to claim 11, further comprising storing the excluded devices in a list, as a blacklist.

19. The method according to claim 11, wherein the automatic checking of the number of working peripheral devices is done by regularly checking USB data sets and storing the USB data sets in protocols list, which are encrypted.

20. The method according to claim 11, wherein of the DMI or SMBIOS or UEFI one or more of the following information is used:
   PC type identification, Motherboard, MB, identification, MB serial number, and GUID of the MB.

* * * * *